United States Patent [19]
Murray et al.

[11] Patent Number: 5,160,707
[45] Date of Patent: Nov. 3, 1992

[54] METHODS OF AND APPARATUS FOR REMOVING ODORS FROM PROCESS AIRSTREAMS

[75] Inventors: Charles M. Murray, Silver Spring; Joel L. Thompson, College Park; Lawrence H. Hentz, Jr., Hampstead, all of Md.

[73] Assignee: Washington Suburban Sanitary Commission, Hyattsville, Md.

[21] Appl. No.: 623,873

[22] Filed: Dec. 7, 1990

Related U.S. Application Data

[62] Division of Ser. No. 398,389, Aug. 26, 1989, Pat. No. 4,994,245.

[51] Int. Cl.$^5$ ............................................. B01D 50/00
[52] U.S. Cl. ...................... 422/170; 55/223; 55/229; 261/17; 261/21; 261/36.1; 261/117; 261/118; 422/172; 423/210; 423/220; 423/237; 423/238; 423/245.1; 423/245.2; 423/243.01
[58] Field of Search ................ 422/170, 172; 423/210, 423/220, 237, 238, 242, 245.1, 245.2, DIG. 18; 261/17, 21, 36.1, 117, 118, DIG. 1; 55/223, 229

[56] References Cited

U.S. PATENT DOCUMENTS

| | | | |
|---|---|---|---|
| 2,050,797 | 8/1936 | Kerschbaum et al. | 55/223 |
| 3,494,099 | 2/1970 | Eng et al. | 55/223 |
| 4,223,614 | 9/1980 | Barkhaus et al. | 110/215 |
| 4,520,761 | 6/1985 | Arnold | 110/215 |
| 4,799,941 | 1/1989 | Westermark | 110/215 |

Primary Examiner—Robert J. Warden
Assistant Examiner—Timothy M. McMahon
Attorney, Agent, or Firm—Millen, White & Zelano

[57] ABSTRACT

After aerating sewage sludge in a composting process, a stream of process air is treated to remove odors therefrom by injecting into the airstream an atomized mixture of dilute sulfuric acid and dilute surfactant to remove ammonia and odorous organic compounds therefrom. The airstream is then oxidized with bleach to remove sulfides and treated with a hydrogen peroxide solution to remove chlorine introduced by the bleach while maintaining the oxidation reaction. A dilution fan is used to further dilute the scrubbed airstream as the airstream is exhausted to the atmosphere.

4 Claims, 7 Drawing Sheets

METHODS OF AND APPARATUS FOR REMOVING ODORS FROM PROCESS AIRSTREAMS

RELATED APPLICATIONS

This application is a divisional of U.S. Pat. application Ser. No. 398,389, filed Aug. 25, 1989, now U.S. Pat. No. 4,994,245, issued Feb. 26, 1991.

BACKGROUND OF THE INVENTION

This invention relates generally to methods of and apparatus for removing odors from airstreams. More particularly, this invention relates to methods of and apparatus for neutralizing odors in a relatively low temperature airstream by removing malodorous constituents from the airstream with finely divided liquid droplets of reagents with which the constituents react.

Offensive odors are characteristic of many chemical process industries and are often difficult and costly to eliminate or control. Of particular interest with respect to the instant invention is the technology of controlling odors emitted by waste water sludge composting facilities, wherein the sludge is biologically degraded into a stable end product. The end product is a sanitary, odor-free humus-like material which is used as a soil conditioner for yards, gardens, and athletic fields. By composting waste water sludge, a material which until recently was considered to be a waste, has become a valuable soil conditioning product which is generally less costly than the top soil or peat moss it replaces yet produces better results. Wide utilization of this resource has been curtailed because composting facilities typically produce undesirable odors. The problem is compounded because composting sites are most conveniently near waste water treatment plants, which themselves are located in or near urban or suburban areas. It is, therefore, necessary to minimize the odor emitted by composting facilities. This invention is directed to that end.

While the technology disclosed in the instant application is of particular significance with respect to waste water sludge compost facilities, it also is applicable to industries such as, but not restricted to, petroleum refineries, rendering plants, pet food producers, flavor and fragrance producers, and fermentation processes. While there are presently no practical federal regulations for odor control, local laws and local political pressure is often sufficient to discourage introduction of such process industries; and, if industries are already established, local laws are sufficiently stringent to enable authorities to act on complaints and level stiff fines and, in some cases, even close plants.

In view of these considerations, a number of approaches have been tried to control odors. The simplest is merely to dilute odorous gas with large quantities of air. Another approach has been to mask offensive odors with more pleasant ones, but this is not particularly successful in that, to some people, the new odor is as unpleasant as the original odor; and, downstream of the plant, the mixture is often not sustained. In any event, any odor emanating from a plant, whether pleasant or unpleasant, is suspect. Incineration has been attempted, but this is a very costly approach in that an entire odorous gas stream must be subjected to combustion temperatures. In a situation where the process has no combustion stage or the airstream is saturated with moisture, such as with process air from a composting system, combustion for odor control is not at all practical.

Another common approach to odor control is by chemical neutralization of odorous compounds. The odorous gas is conventionally washed with an aqueous solution of a reactive chemical in spray towers, packed beds, and the like. Chemicals commonly used for this purpose include permanganates, dichromates, acids, hypochlorite solutions, hydrogen peroxide, and other common oxidizing agents. Exemplary processes are described in British Patent No. 1,152,705 and U.S. Pat. No. 3,923,955. Another approach for chemical neutralization of odors is described in U.S. Pat. No. 4,125,589, in which odoriferous constituents are removed from essentially saturated gas streams utilizing relatively small volumes of liquid in very finely divided droplet form with relatively long gas-liquid contact times. This process was improved upon by the process described in U.S. Pat. No. 4,238,461, wherein the droplet size was further controlled. Further exemplary of the prior art are U.S. Pat. Nos. 4,225,566 and 4,416,861.

U.S. Pat. No. 4,225,566 utilizes two or more liquid reagents, with one being dispensed above another in a reaction vessel through which waste gas is passed, while U.S. Pat. No. 4,416,861 utilizes a two-stage odor control system, wherein exhaust air from fat-rendering plants is fogged with sulfuric acid.

Utilization of the foregoing technology has resulted in removal of a substantial portion of the odor in process air from a composting facility with which the instant inventors have worked. However, the remaining odor is still sufficiently pervasive to precipitate a substantial number of complaints from citizens. While this remaining odor does not present a nuisance which is sufficient to shut down the plant or result in fines, it can affect the plant's reputation and can hinder the erection of more composting facilities. In that it is to everyone's benefit to erect and utilize composting facilities for management of sewage sludge, substantially eliminating all odor is of utmost importance if this concept is to gain wide acceptance.

In eliminating the remaining odor-causing constituents, the inventors fogged the process air with a surfactant solution. This is a unique concept, not taught in the prior art for applications such as a composting facility or other large processing operation. However, the prior art does disclose utilizing detergent to wash odors and grease from cooking stove hoods, as is exemplified in U.S. Pat. Nos. 3,841,062; 4,351,652; and 4,753,218. there is not suggestion in these patents that fogging with surfactants in combination with other scrubbing reagents would result in improved removal of the remaining odor-causing constituents from a stream of relatively low temperature air which has odor-causing constituents generated by a sludge composting system or similar facility.

In view of these and other considerations, there was a need for methods of and apparatus for removing odor-causing constituents from airstreams, which constituents remain as residuals when prior processes are utilized.

SUMMARY OF THE INVENTION

In view of the aforementioned considerations, it is an object of the instant invention to deodorize process gas streams such as airstreams emitted by industrial facilities or the like as completely as possible by removing substantially all odor-causing constituents therefrom.

In view of this and other objects, the instant invention contemplates methods of and apparatus for scrubbing a stream of air which includes undesirable active organic compounds by treating the stream of air with atomized liquid surfactant droplets to remove the undesirable organic compounds therefrom and removing the surfactant droplets retaining the undesirable organic compounds from the stream of air.

The method and apparatus further include continuously recirculating the surfactant forming the droplets through the stream of air while performing the steps of treating the stream with the surfactant droplets and then removing the surfactant condensed from the droplets from the airstream. The above-described methods and apparatus are particularly useful in removing odor-causing compounds such as ketones, alcohols, aldehydes, terpenes, and alkyl benzenes from airstreams such as the exhaust airstreams of air utilized to aerate piles of composting waste water sludge.

In an even more particular application of the instant invention, the stream of exhaust gas, such as air which includes undesirable odor-causing compounds, is scrubbed by treating the airstream with an atomized acid solution and with an atomized surfactant solution. The airstream is then treated with a bleach solution to oxidize sulfides therein and finally treated with a hydrogen peroxide solution to remove chlorine therefrom. By treating the airstream with an atomized surfactant solution, a number of odor-causing constituents are removed from the airstream, which constituents would remain as residuals if the airstream had only been treated with acid, bleach, and hydrogen peroxide.

Again, the concept is of special significance with respect to deodorizing process air used to aerate piles of waste water sludge in a composting operation. However, any airstream having noxious hydrocarbons therein may benefit from the teachings of this invention.

Upon further study of the specification and appended claims, further objects of this invention will become apparent to those skilled in the art.

BRIEF DESCRIPTION OF THE DRAWINGS

Various other objects, features, and attendant advantages of the present invention will be more fully appreciated as the same becomes better understood when considered in conjunction with the accompanying drawings, in which like reference characters designate the same or similar parts throughout the several views and wherein.

DETAILED DESCRIPTION

(a) First Embodiment of the Invention

The following description is directed to utilizing the instant invention with a composting facility; however, the principles of the instant invention may be applied to odor control of other chemical process operations and industries such as petroleum cracking and refining plants, rendering plants, pet food plants, flavor and fragrance production, and fermentation processes and plants.

Figure 1:
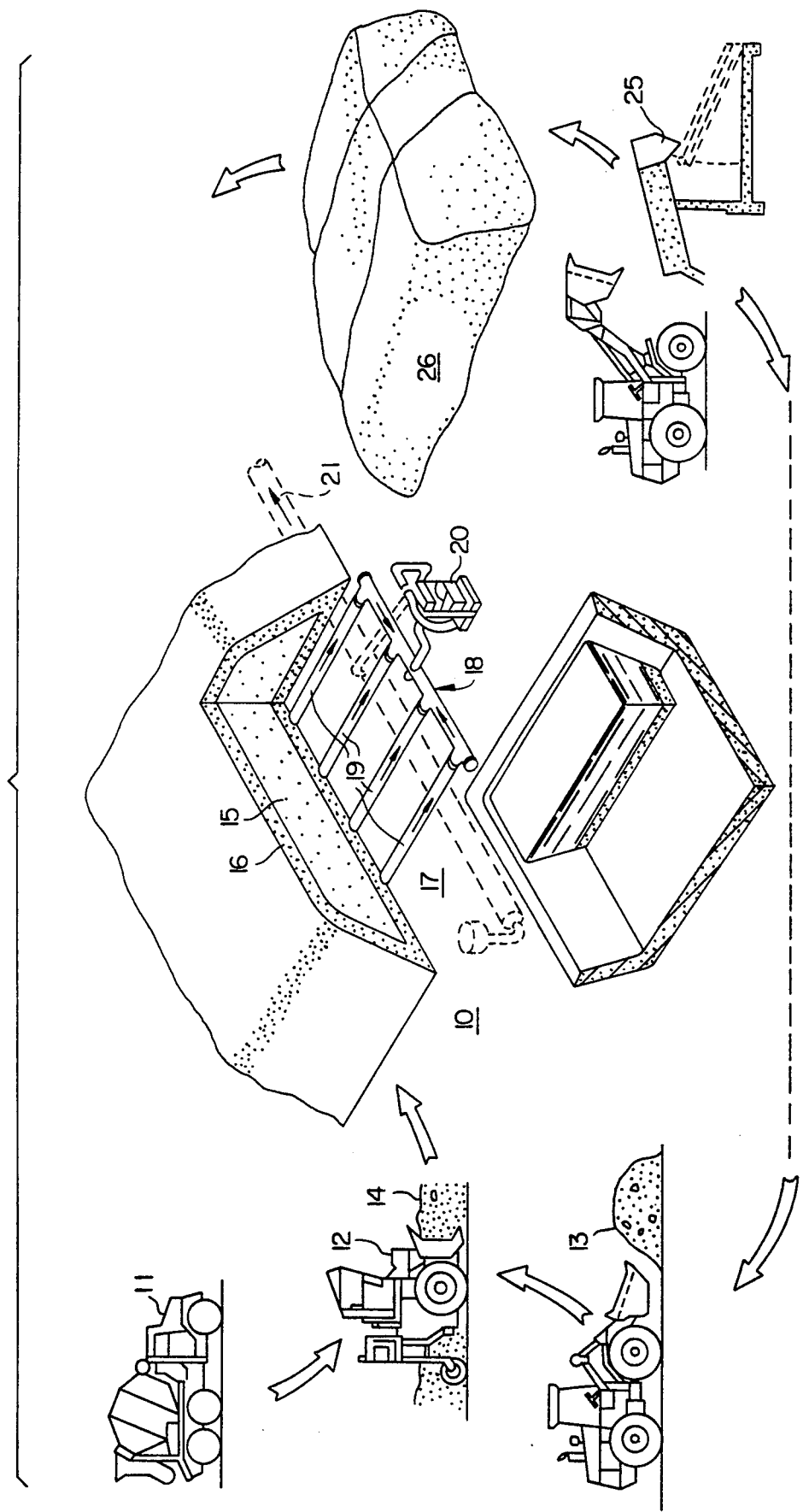
FIG. 1 is a pictorial representation of the sludge composting operation with which the instant invention is used.

Referring now specifically to FIG. 1, showing a composting facility designated generally by the numeral 10, sewage sludge is trucked to the facility in trucks 11 and mixed at a mixing station 12 with wood chips from a wood chip storage station 13 to form a sludge/wood chip mixture 14, of which a composting pile 15 is comprised. The composting pile 15 is surrounded by a blanket of compost 16, which serves as an insulating layer and to help control odor emitted by the wood chip/sludge mixture 14. The compost pile 15 rests on a deck 17 which has a manifold, designated generally by the numeral 18, comprised of a number of air pipes 19 which are perforated. The manifold 18 is connected to a suction air blower 20, which draws air through the composting pile 15 into the perforated pipes 19 and exhausts the air through a header pipe 21.

Figure 2:
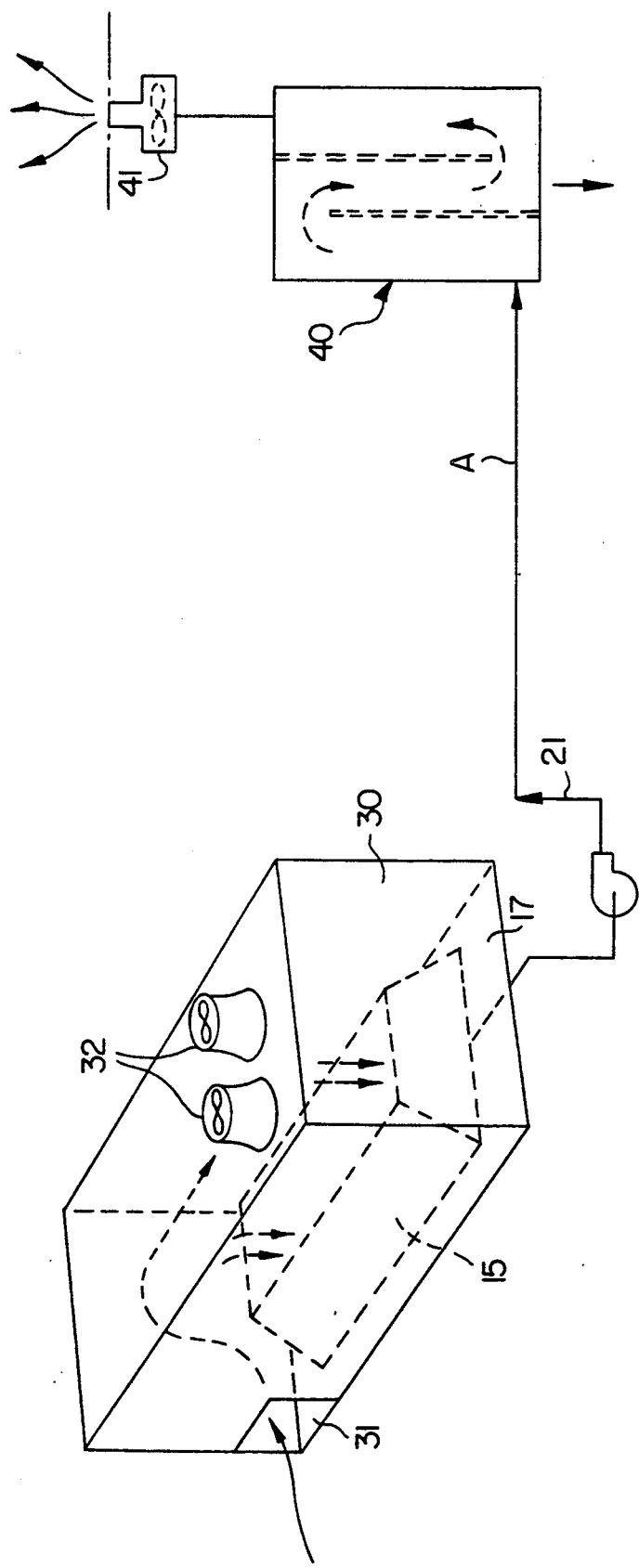
FIG. 2 is a pictorial representation generally showing how process air which has passed through compost piles is processed in accordance with the instant invention.
Figure 3:
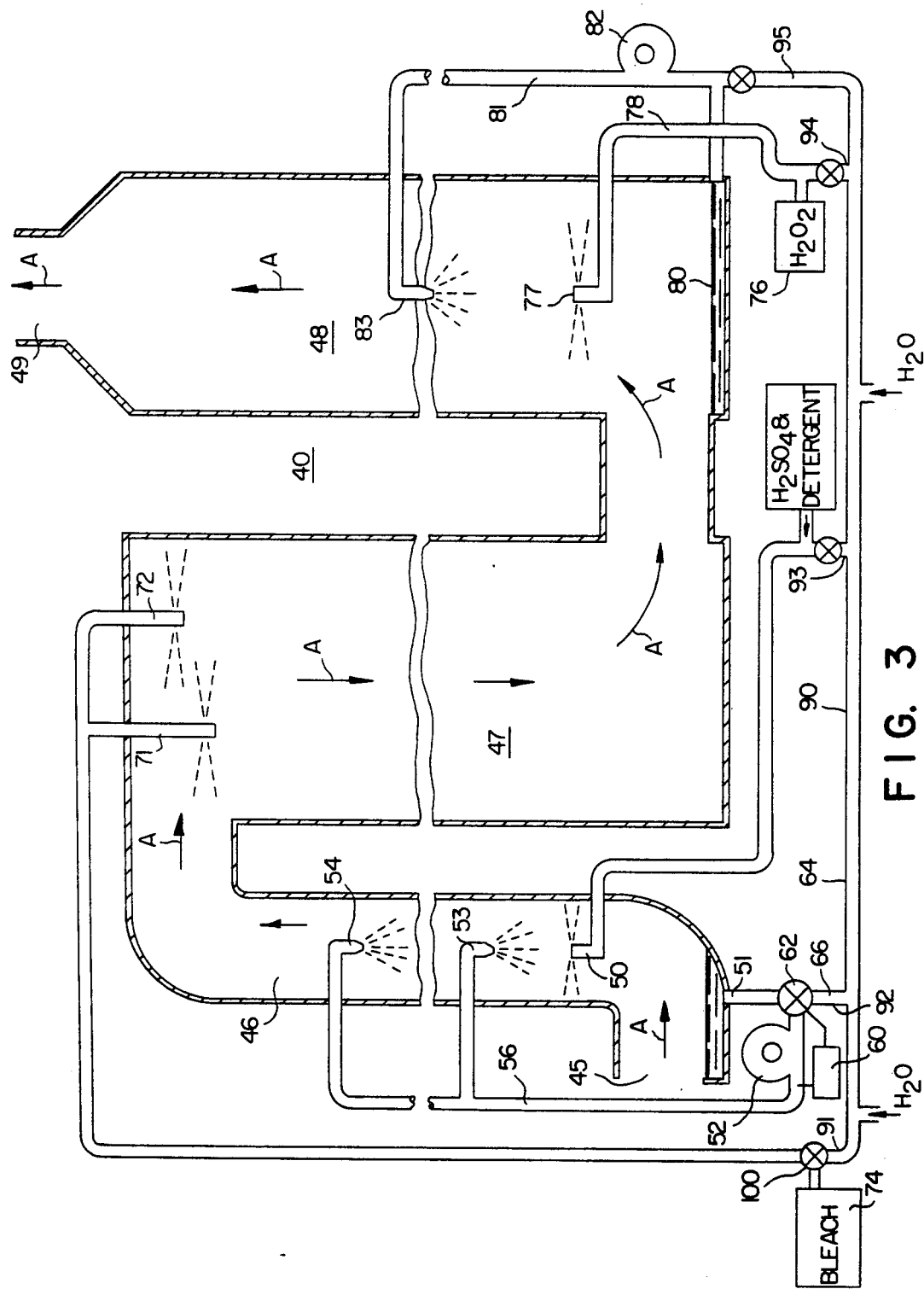
FIG. 3 is a side, diagrammatical view showing an air scrubbing system utilizing the instant invention.
Figure 4:
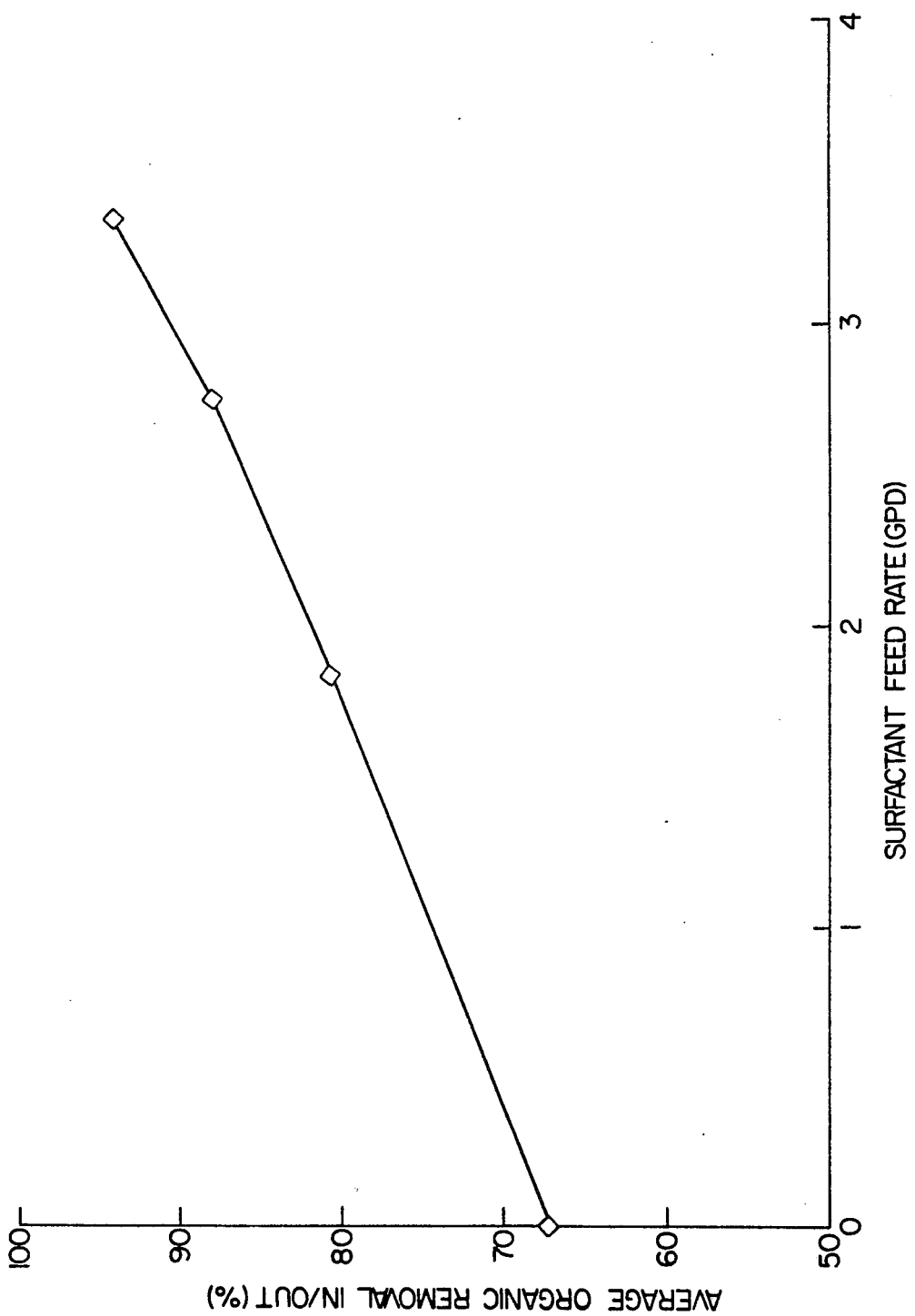
FIG. 4 is a graph showing removal of total active organic compounds as a function of surfactant feed rate in gallons per day.
Figure 5C:
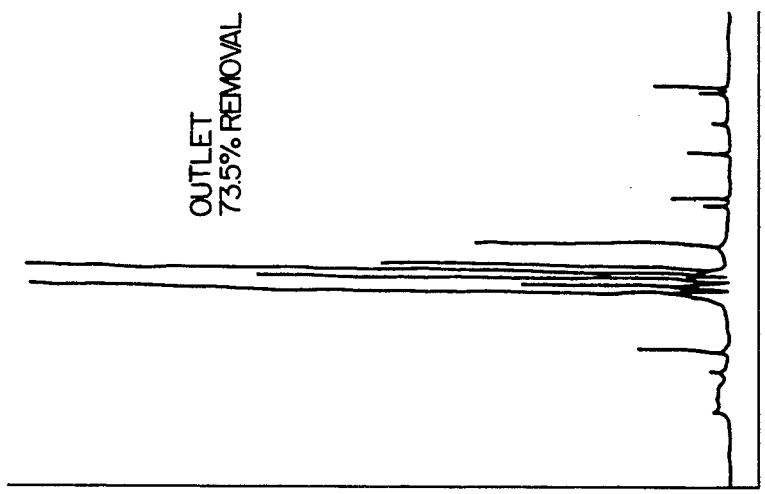
FIGS. 5A, 5B, and 5C are gas chromatograms of the process without surfactant treatment taken at the inlet, after ammonia removal, and at the outlet of the apparatus of FIG. 3.
Figure 5B:
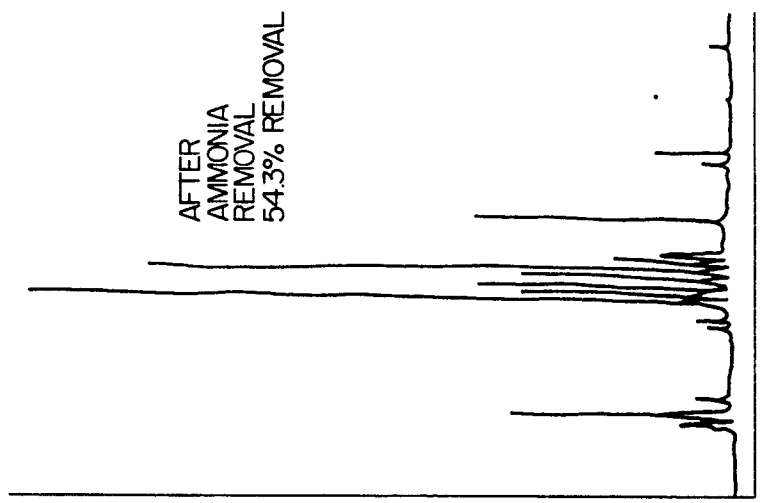
Figure 5A:
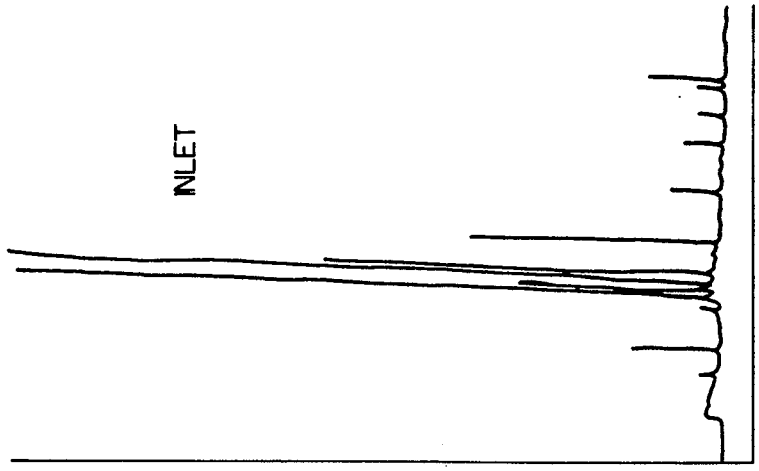
Figure 6C:
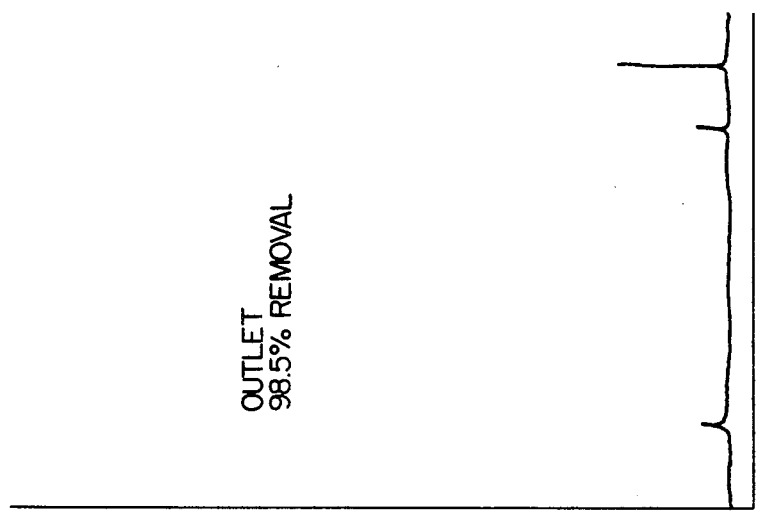
FIGS. 6A, 6B, and 6C are gas chromatographs of the process with surfactant treatment taken at the inlet, after ammonia removal, and at the outlet of the apparatus of FIG. 3.
Figure 6B:
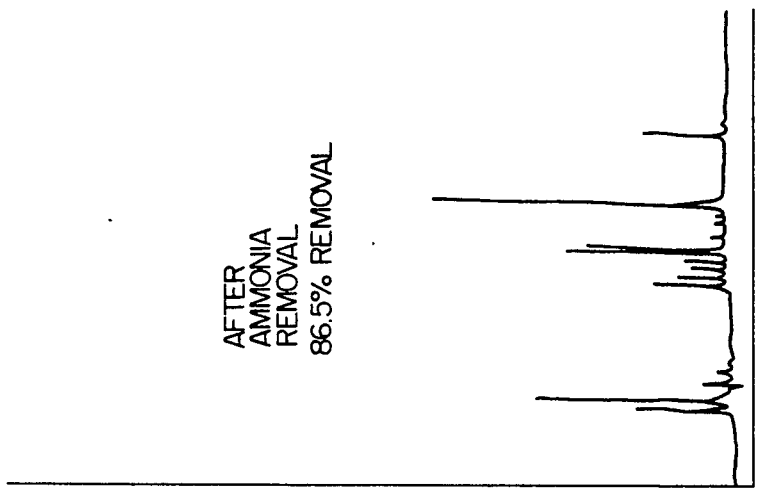
Figure 6A:
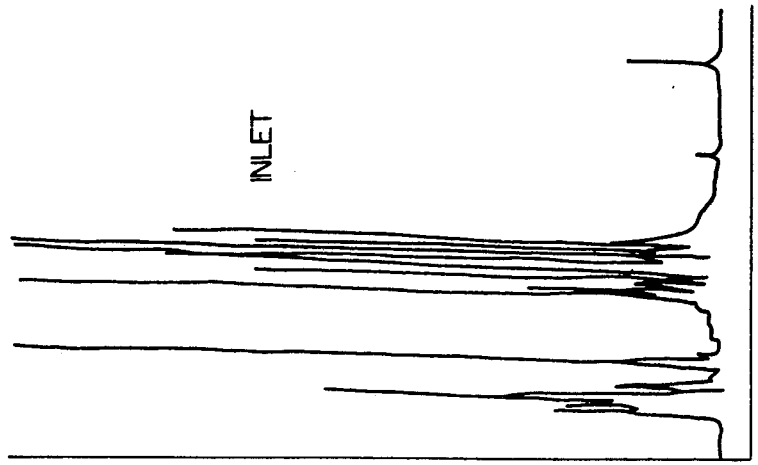
Figure 7:
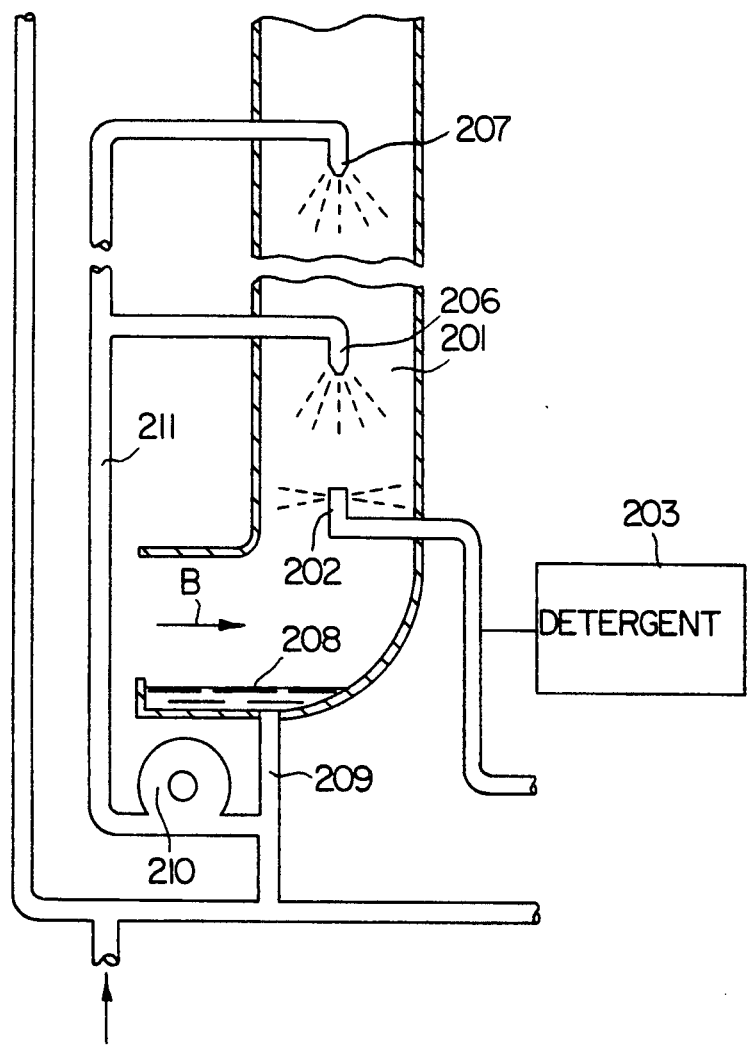
FIG. 7 is a diagrammatical view showing a system specifically used to treat an airstream with detergent.

The air in the header pipe 21 contains a number of malodorous compounds which are removed by the scrubbing system illustrated in FIGS. 2–4. These compounds may include ammonia and organic sulfides as primary offenders and a number of other odor-causing compounds, such as ketones, alcohols, aldehydes, terpenes, alkyl benzenes, and the like, as secondary odor-causing constituents. While the secondary odor-causing constituents are not generally as offensive as the primary constituents, they still cause odor which is sufficiently unpleasant to raise complaints from citizens living proximate and downwind of the composting facility 10.

Generally, the composing pile 15 is aerated for 21 days and then screened at a screening station 25 to remove the wood chips from the mixture. The resultant compost 26 is then stored and cured for approximately one month before being sold as a conditioner for lawns, gardens, athletic fields, and the like. The compost 26 is a useful, highly valuable product, the production of which could be curtailed if odor problems associated with the production are not solved. The instant invention solves the odor problem and thus promotes the production of commercially valuable compost 26.

Referring now to FIG. 2, the composting pile or piles 15 of FIG. 1 are preferably contained within a large industrial building 30, which totally encloses the compost piles in order to prevent ground level discharge of offensive odors. Fresh air is introduced into the building through an inlet 31, which serves as the process air which passes through the compost pile 15. The building 30 is also provided with exhaust fans 32, which disperse building air which is not passed through the compost piles at a height of approximately 40 feet from ground level. The exhaust fans 32 have a capacity to exhaust air at one million cubic feet per minute.

The process air in exhaust line 21 is heated by the decomposing compost piles to approximately 135° F. The process air is passed through an odor scrubber, designated generally by the numeral 40, which, in accordance with the principles of the instant invention, almost entirely removes all odor-causing constituents from the process air. The process air is discharged at a height of approximately 110 feet from ground level through a half-million cubic feet per minute dilution fan 41, which mixes fresh air with the treated process air.

Referring now to FIG. 3, where the odor scrubber 40 is shown in detail, it is seen that the process airstream indicated by the arrow A enters the odor scrubber 40 through a lower inlet 45, rises in a first tower, designated generally by the numeral 46, falls through a second tower, designated generally by the numeral 47, and rises through a third tower, designated generally by the numeral 48, before exhausting through an outlet 49 where the treated outlet air is mixed with fresh air by the 500,000 cubic feet per minute dilution fan 41.

Considering now with more particularity the scrubbing process which takes place within the scrubber 40 of FIG. 3, it is seen that each tower performs a different process, the processes themselves being interrelated. In the first tower 46, a mixture of dilute sulfuric acid and dilute surfactant removes ammonia and volatile organic compounds from the airstream. The second tower 47 removes organic sulfides, primarily dimethyl disulfide, from the airstream with bleach, while the third tower 48 keeps the oxidation reaction of the tower 47 going while removing chlorine produced in the second tower 47.

Considering the first tower 46, it is seen that the airstream passes first by an atomizing nozzle 50, which introduces an atomized spray comprised of a mixture of dilute sulfuric acid and a dilute surfactant. The droplets of the atomized spray are approximately 8 microns so that the mixture of sulfuric acid and surfactant is carried along with the airstream to initially react with the ammonia and active organic compounds entrained therein. The active organic compounds may include malodorous compounds, such as ketones, alcohols, aldehydes, terpenes, and alkyl benzenes, and comprise a relatively small, yet readily detectable component of the exhaust air which, in the absence of ammonia and sulfides, is unmasked and can generate citizen complaints.

As the airstream ascends the tower 46, it is treated with a recycled sulfuric acid-surfactant mix collected from the port 51 at the bottom of the first tower, which is pumped by a pump 52 through a fine spray nozzle 53 disposed downstream of the atomizing nozzle 50 and a coarse spray nozzle 54 disposed downstream of the fine spray nozzle 53. The nozzles 53 and 54 are connected to the pump 52 by a recirculation line 56. The droplets of the coarse and fine spray nozzles 53 and 54 are of sufficient size to fall through the rising airstream A. By introducing a fine spray from fine spray nozzle 53 above the atomized spray from the nozzle 50 and subsequently introducing a coarse spray from the coarse spray nozzle 54, most of the droplets injected into the tower 46 are condensed as atomized droplets condense on coarser droplets and on one another so as to fall through the airstream for collection at a sump to which drainage port 51 is connected. Thereafter, the liquid collected at the sump is recirculated through fine and coarse spray nozzles 53 and 54 under pressure by the pump 52.

The airstream A is neutralized in the tower 46 by injection of the sulfuric acid solution and, to a much lesser extent, by injection of the surfactant solution in the sulfuric acid-surfactant mixture. In order to ensure that the airstream A is continuously neutralized, the recirculated sulfuric acid-surfactant mixture is constantly monitored by a pH monitor 60 connected to the recirculation line 56. If the pH drops below the set point, due to addition of too strong an acid solution, the acid feed rate is reduced; if the pH rises above the set point, the amount of acid flowing through line 56 is increased. This is accomplished in accordance with standard technology by simply adjusting the speed of the acid feed pump. Water from a water line 64 is constantly introduced into the feed line 56 via an inlet 66 keep the recirculating sulfuric acid-surfactant mixture dilute and to waste the undesirable constituents removed from the airstream A.

The neutralized airstream A then passes down through the second tower 47, where a bleach solution of sodium hypochlorite is introduced for oxidizing organic sulfides such as dimethyl disulfide and other similar malodorous constituents. The sodium hypochlorite is introduced through a staggered pair of atomizing nozzles 71 and 72, which treat the neutralized airstream with a dilute solution of sodium hypochlorite. The atomized sodium hypochlorite droplets have a diameter of about 8 microns and are entrained with and carried along with the airstream A down to the bottom of the second tower 47. As the airstream drops in the tower 47, the oxidation reaction takes place to remove sulfides from the airstream.

In order to maintain the oxidation reaction as the airstream rises in the third tower 48 before exiting through exhaust 49, the airstream is then treated with a relatively weak solution of hydrogen peroxide dispensed from a reservoir 76. The hydrogen peroxide also removes chlorine from the airstream so that odor of chlorine is not present in the airstream. Even in small concentrations, chlorine can be irritating; and, in any event, it is preferable to have the exhaust from the tower 48 as odor free as possible. In the illustrated embodiment, hydrogen peroxide is introduced in the rising airstream A through an atomizing 77 nozzle, which atomize the hydrogen peroxide to a diameter of approximately 8 microns. The dilute solution of hydrogen peroxide is piped from the reservoir 76 to the nozzle 77 through a line 78 and is continuously recirculated from a supply which pools in a sump 80 at the bottom of the third tower 48.

Hydrogen peroxide pooling in the sump 80 of third tower 48 is recirculated in a line 81 by pump 82 and dispensed in a relatively coarse spray by nozzle 83 positioned above the atomizing nozzle 77. The relatively small atomized droplets from nozzle 77 condense on the relatively large droplets from the coarse spray nozzle 83 and precipitate out of the airstream A to pool at the sump 80 of the tower 48 so as to be recirculated through line 81 by the pump 82. The airstream A flowing from the exhaust 49 has now been scrubbed to remove odor-causing constituents and, as illustrated in FIG. 2, is mixed with a very large volume of fresh air by the air dilution fan 41.

In order to properly dilute each of the scrubbing liquids, i.e., the acid/surfactant mixture, the sodium hypochlorite bleach and the hydrogen peroxide wash, water is constantly introduced through a line 90, which has feed lines 91–95 connected to each liquid line. The line 91 is connected by a chemical feed pump IQ0 to the sodium hypochlorite line 73 so as to mix with sodium hypochlorite dispensed from reservoir 74. Line 92 replenishes water through the recirculation line 56 for the acid/surfactant mixture. Line 93 provides dilution water for the acid input. Line 94 provides dilution water for the hydrogen peroxide in line 78, and line 95 maintains the water content for recirculating hydrogen peroxide in line 81.

Without further elaboration, it is believed that one skilled in the art can, using the preceding description, utilize the present invention to its fullest extent. The following preferred specific embodiment is, therefore, to be construed as merely illustrative and not limitative of the remainder of the disclosure in any way whatsoever.

Example of the First Embodiment

In a specific installation utilized to treat process air as the air is exhausted from a waste water sludge composting facility such as that shown in FIGS. 1 and 2, the stream of process air A moving at the rate of about 25–30,000 cubic feet per minute is processed by cylindrical towers 46, 47, and 48, each having a height of about 60 feet and supplied by Quad Environmental Technologies Corporation of Highland Park, IL. The first tower 46 has a diameter of about 4½ feet, with the nozzles 50, 53, and 54 positioned at heights of about 10 feet, 18 feet, and 27 feet, respectively, from the base on the tower 46. The nozzle 50 is a atomizing nozzle, available from Quad Environmental Technologies Corporation. It dispenses a dilute solution of sulfuric acid ($H_2SO_4$) in the range of about 2.0 to 3.0 percent and is mixed with a surfactant to a solution in the range of 0.05 percent to 0.20 percent, and preferably about 0.10 percent. The nozzle 50 dispenses the mixture as droplets in the range of 1 to 20 microns in diameter, in the preferable range of 6 to 10 microns in diameter, and preferably about 8 microns in diameter, at a rate in the range of 1 to 4 gallons/minute, and preferably about 3.0 gallons/minute. The current surficant utilized is a detergent in the form of retail TIDE detergent manufactured by Procter & Gamble under U.S. Pat. Nos. 4,318,818; 4,702.857; 4,304,679; 4,597,898; 4,561,998; 4,507,219; and 4,515,705, each of which patents is hereby incorporated by reference. The fine and coarse spray nozzles 53 and 54 are nozzles available from Bete Fog Nozzle Corp., Model Nos. WL2030 and NCM0706K-15, respectively, and dispense the reciculated mixture at a rate of about 50 gallons per minute.

From the first tower 46, the airstream expands in second tower 47, which has a diameter of about 12 feet and dispenses a dilute percent solution of sodium hypochlorite in the range of 0.05 to 1.5 percent, and preferably about 0.80 percent, from nozzles 71 and 72, which are atomizing nozzles available from Quad Environmental Technologies Corporation and dispense the sodium hypochlorite solution at a rate of about 1.5 gallons per minute each for a preferred total of about 3 gallons per minute with an acceptable total range of 1.0 to 4.0 gallons per minute. The dilute sodium hypochlorite solution is atomized as droplets ranging from 1 to 20 microns in diameter and preferably about 8 microns in diameter.

The airstream A is then slightly compressed as it flows into tower 48, which has a diameter of 10 feet. The atomizing nozzle 77 is positioned about 7 feet from the floor of the 60-foot tower and dispenses a dilute solution of hydrogen peroxide ($H_2O_2$) a rate in the range of 1 to 6-gallons/minute, and preferably about 3 gallons/minute, the atomizing nozzle again dispensing the solution in droplet sizes ranging from 1 to 20 microns, and preferably about 8 microns. The spray nozzle 83 is a full 60° cone Model No. TF32NN, available from Bete Fog Nozzle Corp., and is positioned 15 feet above the atomizing nozzle 75. The hydrogen peroxide is pumped through the nozzle 83 at a rate in the range of 0.5 to 2 gallons/hour, and preferably at about 1 gallon/-hour.

As is seen in FIG. 4, the surfactant feed rate is a little over 3 gallons per day to remove more than 90% of odor-causing compounds remaining after treatment with sulfuric acid and sodium hyperchlorite, which removes 90% of the odor-causing components of the stream, i.e., ammonia and dimethyl disulfide. Thus, the entire range of odor-causing compounds is reduced more than 99% by introducing a surfactant into the process.

As is seen by the chromatographs of FIG. 5A-5C, the active organic compounds, as exemplified by the tall spikes, remain in the airstream A from inlet to outlet if the airstream is not treated with a surfactant. As is seen in FIGS. 6A-6C, the detectable amounts of active organic compounds initially in the airstream A, as indicated by the tall spikes in FIG. 6A, have disappeared almost completely at the outlet, as is seen in the absence of tall spikes in FIG. 6C, the active organic compounds having been initially diminished at the end of the oxidation stage, as is seen in FIG. 6B.

(b) Second Embodiment of the Invention

Referring now to FIG. 7, there is shown a second embodiment of the invention, wherein airstream B is treated to remove active organic compounds such as hydrocarbons which might be produced from chemical plants such as petrol chemical plants and other chemical plants having malodorous emissions. In the apparatus of FIG. 4, a gas stream, such as an airstream B, enters the inlet of scrubbing tower 201 and is exposed to surfactant dispensed from an atomizing nozzle 202, similar to the atomizing nozzle 50 of FIG. 3. The atomizing nozzle 202 is supplied from a reservoir 203, which is filled by recirculating solution containing surfactant.

Disposed above atomizing nozzle 202 is a fine spray nozzle 206 and a coarse spray nozzle 207, which dispenses relatively large droplets that fall through the airstream B as the airstream rises in the tower 201, causing the droplets dispensed by the fogging nozzle 202 to condense thereon and pool in a sump 208 at the bottom of the tower 201. The dilute surfactant pooled at the bottom of tower 201 drains through a line 209 and is recirculated by a pump 210 through a line 211 to the spray nozzles 206 and 207.

Malodorous organic compounds are removed from the airstream B by the surfactant sprays from nozzles 206 and 202 utilizing relatively dilute amounts of surfactant solution. For example, an airstream of 25,000 to 30,000 cubic feet per minute is treated with a surfactant solution of approximately 0.10 percent to remove odor-causing organic compounds such as ketones, alcohols, aldehydes, terpenes, and alkyl benzenes. Since the detergent solution is recirculated, it is necessary for such a volume of air to add only 3 to 5 gallons of surfactant to the solution each day.

(c) Third Embodiment of the Invention

Referring again to FIG. 3, in situations where the airstream A contains little or no ammonia, such as certain refineries and smelters, painting facilities, and the like, it is not necessary to treat the airstream with sulfuric acid in order to reduce ammonia. Accordingly, the treatment utilizes a weak surfactant solution in the tower 46, followed by the bleach treatment and hydrogen peroxide treatment previous described in the full description of FIG. 3.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. Apparatus for scrubbing a steam of process air from a sewage composting facility, wherein the process air has been used to aerate compost for passage therethrough, the process air including ammonia, sulfides, and malodorous organic compounds, the apparatus comprising:

a first tower having an upper end and a lower end with an inlet at the lower end and an outlet at the upper end, the first tower including an atomizing station for treating the process air with an atomized dilute sulfuric acid mixture as the air rises in the first tower from the lower to the upper end, the mixture having atomized droplets of a selected size, the first tower further including a sump at the lower end thereof for removing the dilute sulfuric acid mixture from the rising airstream and a recirculating means for recirculating the mixture and spraying the mixture at a recirculating station into the airstream upstream of the atomizing station and beneath the upper end of the first tower, the mixture being sprayed at the recirculation station having droplets of a size substantially larger than the atomized droplets;

a second tower having an upper end and lower end with an inlet at the upper end connected to the outlet of the first tower and an outlet at the lower end, the second tower including means proximate the upper end thereof for oxidizing the organic sulfides in the airstream subsequent of removing ammonia and active organic compound therefrom by treating the airstream with an atomized solution of sodium hypochlorite prior to descent of the airstream in the second tower; and a third tower having a lower end an upper end, the lower end having an inlet connected to the outlet of the second tower and the upper end providing an outlet for the airstream, the third lower including atomizing means at a site proximate the lower end thereof for treating the airstream with an atomized hydrogen peroxide solution with atomized droplets of a selected size as the airstream rises in the third tower to maintain the oxidation reaction wile removing chlorine from the airstream, the third tower further including means of precipitating products of the oxidation reaction from the airstream by recirculating the hydrogen peroxide solution and spraying the hydrogen periodic solution into the airstream in a droplet size substantially larger than the atomized droplet size at a location downstream of the site of the atomizing means for treating the airstream with hydrogen peroxide.

2. The apparatus of claim 1, wherein the means for condensing the dilute sulfuric acid comprises a sump in the first tower; a fine spray nozzle disposed above the atomizing stage and a coarse spray nozzle disposed above the fine spray nozzle, the spray nozzles being connected by a feed line to the sump; a pump for pumping the mixture from the sump through the spray nozzles; a ph meter monitoring the pH of the mixture in the feed line; and means or controlling the pH of the mixture by increasing or reducing the amount of water added to the mixture.

3. The apparatus of claim 1 further including a dilution fan connected to the outlet of the third tower for mixing the airstream with fresh air.

4. The apparatus of claim 1 further including means for mixing a surfactant with the dilute sulfuric acid.

* * * * *